United States Patent [19]

Inaba et al.

[11] 4,206,081

[45] Jun. 3, 1980

[54] PROCESS FOR PRODUCING HIGHLY ACTIVE DENITRATING CATALYSTS

[75] Inventors: Hideya Inaba; Kazuo Maeda; Yasumi Kamino; Toshio Hama; Kenichi Nagai; Masayoshi Ichiki, all of Osaka, Japan

[73] Assignee: Hitachi Shipbuilding & Engineering Co., Ltd., Osaka, Japan

[21] Appl. No.: 848,235

[22] Filed: Nov. 3, 1977

[30] Foreign Application Priority Data

Nov. 9, 1976 [JP] Japan .............................. 51-134860
Nov. 9, 1976 [JP] Japan .............................. 51-134861
Mar. 4, 1977 [JP] Japan .............................. 52-24165

[51] Int. Cl.$^2$ ..................... B01J 21/04; B01J 23/74; B01J 25/00; B01J 27/02
[52] U.S. Cl. ..................................... 252/440; 252/464; 252/472; 252/470; 252/477 Q; 423/239
[58] Field of Search .................. 252/464, 472, 477 Q, 252/440; 423/239 A, 213.5

[56] References Cited

U.S. PATENT DOCUMENTS

| | | | |
|---|---|---|---|
| 3,712,856 | 1/1973 | Betz ................................ | 252/477 Q |
| 3,939,097 | 2/1976 | Takeoka et al. ................... | 252/466 J |
| 4,040,981 | 8/1977 | Inaba et al. ....................... | 252/466 J |
| 4,048,112 | 9/1977 | Matsushita et al. .............. | 423/239 A |

*Primary Examiner*—W. J. Shine
*Attorney, Agent, or Firm*—Tilton, Fallon, Lungmus & Chestnut

[57] ABSTRACT

A highly active denitrating catalyst is produced by converting the surface layer of steel material to an aluminum alloy, treating the resulting steel material with an aluminum dissolving solution to dissolve out the aluminum and to render the surface layer porous, and immersing the steel material having the porous surface layer in a solution containing a vanadium compound to cause the porous surface layer to support the vanadium compound.

10 Claims, 1 Drawing Figure

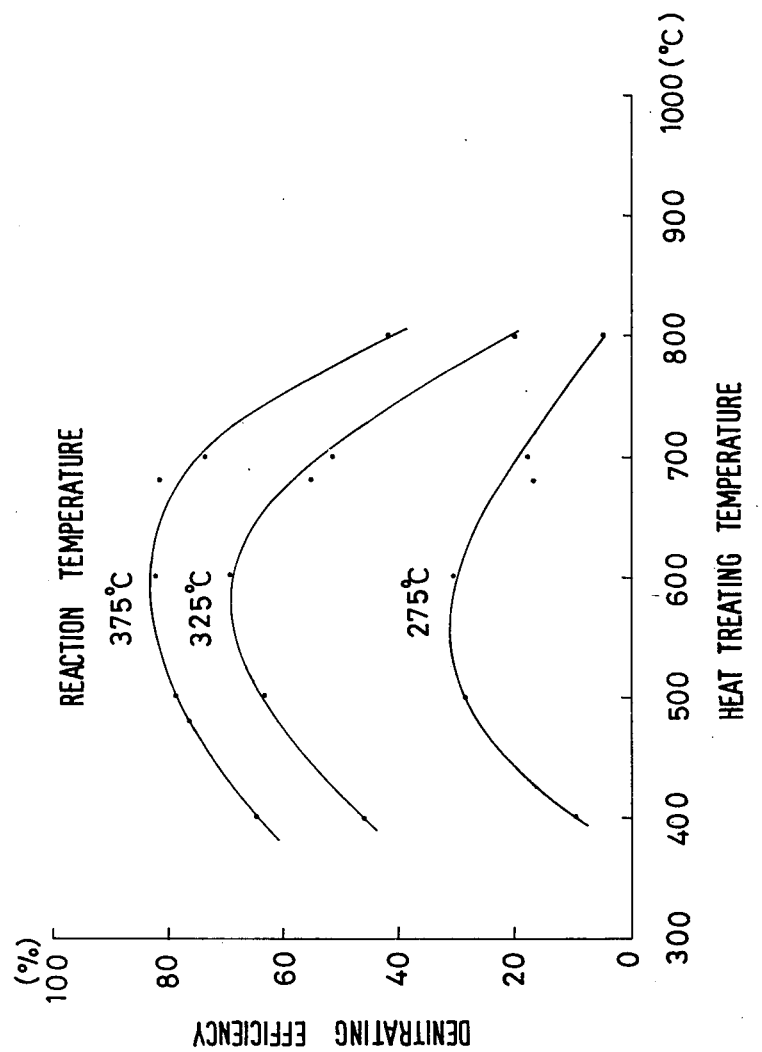

PROCESS FOR PRODUCING HIGHLY ACTIVE DENITRATING CATALYSTS

BACKGROUND OF THE INVENTION

This invention relates to a process for producing highly active denitrating catalysts, and more particularly to a process for producing catalysts useful in a reaction in which nitrogen oxides are selectively catalytically reduced with ammonia ($NH_3$).

It is recognized that the nitrogen oxides (hereinafter referred to as "$NO_x$") released to the atmosphere from thermoelectric power stations, ironworks, chemical plants, motor vehicles, etc., cause photochemical smog, so that much attention has been given to the treatment of $NO_x$ in recent years.

Methods of removing $NO_x$ heretofore proposed include one in which $NO_x$ are catalytically reduced with the use of $NH_3$ as a reducing agent. This method appears more advantageous than others since $NH_3$ selectively reacts with $NO_x$ as represented by the following equations, even when the exhaust gas contains more than 1% by volume of oxygen.

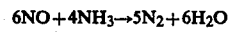

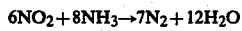

The known catalysts useful in this method include those comprising a heavy metal compound supported on a carrier such as active alumina, silica alumina or zeolite. These catalysts are generally intended for use in fixed beds. Accordingly if it is attempted to achieve an increased space time yield (S.T.Y.), the emission will involve an increased pressure loss, while solid particles in the emission will clog up the catalyst layer. To overcome such drawbacks, it has been proposed to use carriers of porous structure.

Generally thermoelectric power stations and ironworks releases tremendous quantities of emissions which require large quantities of catalysts for treatment. Catalysts composed of porous carriers for this purpose therefore should preferably be large-sized and have high strength so as not to be fractured during charging. A catalyst is already known which fulfills such requirements and which is prepared by converting the surface layer of steel material to an aluminum alloy, immersing the resulting steel material in an aqueous alkali solution to dissolve out the aluminum and to thereby render the surface layer porous, and subjecting the resulting material to suitable oxidizing treatment. This catalyst is practically useful because the porous surface layer remains relatively intact and acts effectively even in the presence of $SO_2$ or water vapor contained in the emission. However, the catalyst has the drawback that it exhibits seriously reduced denitrating activity at about 300° C. and slighter lower temperatures.

SUMMARY OF THE INVENTION

The object of this invention which has been accomplished in view of the foregoing situations is to improve the conventional catalyst of porous steel material and to provide a process for producing denitrating catalyst having high activity even at relatively low temperatures. The process of this invention comprises the first step of converting the surface layer of steel material to an aluminum alloy, the second step of treating the resulting steel material with an aluminum dissolving solution to dissolve out the aluminum and to render the surface layer porous, and the third step of immersing the steel material having the porous surface layer in a solution containing a vanadium compound to cause the porous surface layer to support the vanadium compound.

The steel material, when rendered porous by the first and second steps, has catalytic activity for use in reactions in which $NO_x$ is selectively catalytically reduced with $NH_3$. When the steel material is further subjected to the third step of this invention in which the porous surface layer is caused to support the vanadium compound, a denitrating catalyst is obtained which has high activity even at about 300° C. and slightly lower temperatures.

BRIEF DESCRIPTION OF THE DRAWING

The drawing is a graph showing the relationship between the heat treating temperature for the production of the catalyst and the denitrating efficiency achieved by the catalyst.

PREFERRED EMBODIMENTS OF THE INVENTION

Examples of useful steel materials to be subjected to the first step are stainless steel, nickel steel, tungsten steel, molybdenum steel, etc. The surface layer of the steel material is converted to an aluminum alloy usually by coating the steel material with aluminum and heat-treating the aluminum-coated steel material. The steel material is coated with aluminum, for example, by hot dipping, cementation, vacuum evaporation, spray coating or like plating method. Preferably the heat treatment is conducted in a nitrogen gas or like inert gas atmosphere at a temperature of at least the melting point of aluminum (about 660° C.) for 0.1 to 10 hours. The heat treatment causes the solid phases of steel and aluminum to diffuse through each other, forming an alloy.

The second step in which aluminum is dissolved out from the steel material having the alloy layer is carried out by immersing the steel material in a solution capable of dissolving aluminum or by spraying an aluminum dissolving solution against the alloy layer of the steel material. Useful aluminum dissolving solutions are aqueous acid or alkali solutions. Examples of useful acids are mineral acids such as hydrochloric acid and nitric acid. Examples of useful alkalis are sodium hydroxide and like alkali metal hydroxides, alkali metal carbonates, alkaline earth metal hydroxides. Aqueous solutions of alkali metal hydroxides are especially preferable to use. The temperature of the aluminum dissolving solutions, although not particularly limited, is preferably room temperature to 100° C. The dissolving out of the aluminum from the surface layer renders the surface layer porous. The steel material having the resulting porous surface layer is washed with water and dried in the usual manner. It is not always required to completely dissolve out the aluminum; good results are achievable if at least 50% of the aluminum is dissolved out.

Preferably the porous surface layer resulting from the second step is oxidized with an oxygen-containing gas before being subjected to the third step. More preferably the porous surface layer is sulfated with a gas containing sulfur dioxide gas ($SO_2$) after or simultaneously with the oxidizing treatment.

The oxidizing treatment is carried out by contacting the porous surface layer with a gas containing 0.1 to 20.8% by volume of oxygen under mild conditions, for example at approximate room temperature to 400° C. for 0.1 to 20 hours. The oxidizing treatment imparts enhanced catalytic activity to the surface layer.

The sulfating treatment is effected by bringing the porous surface layer into contact with an $SO_2$ containing gas. The conditions under which this treatment is carried out, such as the temperature, duration and gas composition, are not limited. Usually the treatment is conducted at approximate room temperature to 400° C. for 0.1 to 20 hours with the use of a gas containing at least 100 ppm of $SO_2$. The treating conditions are suitably determined within the above-mentioned ranges. For example, when the $SO_2$-containing gas has a low temperature and a low $SO_2$ concentration, the contact is effected for a prolonged period of time. This treatment sulfates the surface of the porous portion, consequently preventing the catalytic decomposition of $NH_3$ in the denitrating reaction.

$H_2O$, $CO_2$, $N_2$, combustible gas or like gas, even if contained in the oxidizing gas and in the sulfating gas, will produce little or no influence on the effects achieved by the treatments. Further when the exhaust gas to be treated contains oxygen and/or $SO_2$ in the specified concentrations, the oxidizing and sulfating treatments may be omitted, since the catalyst comes into contact with such gases during use in the denitrating reaction.

The third step is carried out immediately after the second step or after the oxidizing treatment and/or the sulfating treatment following the second step, by immersing the steel material having the porous surface layer in a solution containing a vanadium compound, such as aqueous solution or oxalic acid solution of ammonium metavanadate, oxalic acid solution of vanadium pentoxide, aqueous solution of vanadyl sulfate or the like. When the aqueous solution of vanadyl sulfate is used, the steel material withdrawn from the solution is heated for 1-4 hours at a temperature of at least 400° C. to decompose the vanadyl sulfate. When the other vanadium compound-containing solutions are used, the steel material withdrawn from the solution is dried at about 100° C. The temperature of the solution for the third step is not limited and may be room temperature. The duration of the immersion, although not limited, is preferably 0.1 to 1 hour. These treating conditions are suitably determined so that the resulting catalyst will contain the desired amount of the vanadium compound. In this way a catalyst is obtained in which the vanadium compound is supported on the porous surface layer. The catalysts in which the ratio of the content of the vanadium compound to the amount of the active layer is at least 0.01 have high denitrating activity. The amount of the active layer mentioned is expressed in terms of the weight of the porous active layer per unit surface area of the steel material before it is rendered porous.

The catalyst resulting from the third step is preferably treated by being heated advantageously at a temperature of 450° to 700° C., more advantageously at the temperature (640° C.) at which iron oxide and vanadium pentoxide form a eutectic mixture. $H_2O$, $CO_2$, $N_2$, combustible gas or like gas, even if contained in the atmosphere for the treatment, will produce little or no influence on the effects achieved by this treatment. The heat treatment gives the catalyst remarkable improved resistance to $SO_3$.

EXAMPLE 1

First step:
A panel of SUS 304 (JIS) steel, 2 mm×33 mm×50 mm, was immersed in a molten bath of aluminum at 680° C. for 20 minutes. The aluminum-coated steel panel was then heat-treated in a nitrogen atmosphere at 800° C. for 1 hour to convert the surface layer of the steel panel to an aluminum alloy.

Second step:
The steel panel having the alloy layer was immersed in 200 ml of aqueous solution containing 10% by weight of NaOH at about 20° C. for 2 hours to dissolve out the aluminum from the alloy layer, thereby rendering the surface layer porous. Subsequently, the steel panel was washed with water treated with ion exchange resin and was dried in the atmosphere.

After the second step, the porous surface layer of the steel panel was oxidized with nitrogen gas containing 3% by volume of oxygen at 300° C. for 1 hour.

Third step:
The resulting steel panel was immersed in 200 ml of oxalic acid solution containing 1 mole of ammonium metavanadate per liter of the solution at room temperature for 30 minutes, thereafter withdrawn from the solution and dried at about 100° C., whereby a catalyst containing the vanadium compound was obtained.

EXAMPLE 2

A catalyst was produced in the same manner as in Example 1 except that the material of the steel panel used was SUS 316 (JIS) in place of SUS 304.

EXAMPLES 3 TO 9

First and second steps:
The surface layer of each panel was rendered porous by repeating the same procedures as in the first and second steps of Example 1 except that the material of the panel used was SS 41 (JIS) in place of SUS 304.

After the second step, the porous surface layer formed was oxidized in the same manner as in the oxidizing treatment of Example 1.

Third step:
Following a procedure similar to that of the third step of Example 1, the steel panels were caused to support vanadium compounds by immersing the panels respectively in an oxalic acid solution of ammonium metavanadate, aqueous solution of ammonium metavanadate and aqueous solution of vanadyl sulfate having varying concentrations whereby catalysts were prepared. The steel panel immersed in the aqueous solution of vanadyl sulfate was heat-treated at about 500° C. for 2 hours after having been withdrawn from the solution.

COMPARISON EXAMPLE 1

The same procedures as in the first and second steps of Example 1 were repeated to form a porous surface layer on a steel panel.

The porous surface layer was oxidized in the same manner as in the oxidizing treatment of Example 1 to obtain a catalyst.

COMPARISON EXAMPLES 2 AND 3

Catalysts in the form of a steel panel having a porous surface layer were produced by following procedures similar to those of Comparison Example 1, namely by repeating the first and second steps and the subsequent oxidizing treatment of Example 2 and by repeating the first and second steps and the subsequent oxidizing treatment of Example 3, respectively.

Table 2 shows the amount of the active layer of each of the catalysts obtained in Examples 1 to 9 and the content of the vanadium compound thereof as well as the amount of active layer of each of the catalysts prepared in Comparison Examples 1 to 3.

Activity test

The denitration efficiency of each of the catalysts produced in Examples 1 to 9 and in Comparison Examples 1 to 3 was determined in the following manner.

Panels of the catalyst were charged into the catalyst accommodating portion, in the form of a rectangular parallelepiped, of a reactor tube. With use of a usual flow system, a simulated exhaust gas having the composition shown in Table 1 was passed through the reactor tube at a flow rate of 1 liter per minute for denitration reaction while controlling the reaction temperature. During the reaction, the concentration of $NO_x$ was measured at the inlet and outlet of the reactor tube. The same procedure as above was repeated for each catalyst to determine the denitration efficiency. Table 2 shows the results.

acid to remove the porous portion and dividing the resulting reduction (g) in the weight of the panel by the surface area ($m^2$) of the steel panel before it was rendered porous. The content of the vanadium (i.e., V) compound is the value obtained by dividing the weight (g) of the vanadium compound supported on the steel panel by the surface area ($m^2$) of the steel panel before it was rendered porous.)

Table 2 reveals that the catalysts containing the vanadium compounds have higher activity even at temperatures of around 300° C. than those containing no vanadium compound.

EXAMPLES 10 TO 15

First and second steps:

The same procedures as in the first and second steps of Example 1 were repeated to form a porous surface layer on each steel panel.

After the second step, the porous surface layer was oxidized in the same manner as in the oxidizing treatment of Example 1.

The oxidized porous surface layer was then treated with an $SO_2$-containing gas under the conditions (temperature, time and gas composition) listed in Table 3 to sulfate the surface of the porous layer.

Third step:

The steel panel having the porous surface layer thus treated was further treated in the same manner as in the third step of Example 1 to obtain a catalyst. Table 3 shows the amount of the active layer and the content of the vanadium compound of the catalyst.

Activity test

The catalysts produced in Examples 10 to 15 were

Table 1

| Components of gas | Composition (vol %) |
|---|---|
| NO | 0.05 |
| $NH_3$ | 0.05 |
| $CO_2$ | 13.0 |
| $H_2O$ | 10.0 |
| $O_2$ | 3.6 |
| $SO_2$ | 0.025 |
| $N_2$ | Balance |

Table 2

| Ex No. | Material of steel panel | V compd-contg soln and its concn (mole/l) | | Amount of active layer(g/$m^2$) | Content of V compd (g/$m^2$) | Denitration efficiency (%) at reaction temp of: | | |
|---|---|---|---|---|---|---|---|---|
| | | | | | | 300° C. | 350° C. | 400° C. |
| 1 | SUS 304 | Oxalic acid soln of $NH_4VO_3$ | 1.0 | 141 | 3.2 | 55.4 | 74.1 | 83.6 |
| 2 | SUS 316 | " | | 138 | 3.0 | 50.7 | 72.5 | 82.0 |
| 3 | SS-41 | A9 soln of $NH_4VO_3$ | 0.1 | 130 | 0.53 | 49.0 | 71.2 | 83.0 |
| 4 | " | Oxalic acid soln of $NH_4VO_3$ | 0.1 | 132 | 0.42 | 38.1 | 66.2 | 82.0 |
| 5 | " | " | 0.5 | 135 | 1.8 | 53.2 | 72.0 | 80.0 |
| 6 | " | " | 1.0 | 138 | 3.0 | 56.1 | 72.5 | 80.0 |
| 7 | " | " | 1.5 | 141 | 4.1 | 70.4 | 82.5 | 87.5 |
| 8 | " | " | 2.0 | 145 | 5.0 | 71.5 | 83.2 | 87.0 |
| 9 | " | Aq soln of vanadyl sulfate | 1.0 | 135 | 2.8 | 56.0 | 70.0 | 78.8 |
| Comp Ex No. | | | | | | | | |
| 1 | SUS 304 | — | | 125 | — | 25.5 | 60.4 | 85.0 |
| 2 | SUS 316 | — | | 131 | — | 23.7 | 54.5 | 82.5 |
| 3 | SS-41 | — | | 128 | — | 21.5 | 55.1 | 80.0 |

(The amount of the active layer was determined by rubbing the surface of the steel panel with absorbent cotton impregnated with 6 N aqueous solution of nitric tested in the same manner as above for denitration efficiency, with the results shown in Table 3.

Table 3

| Ex. No. | $SO_2$ treatment conditions Temperature Time Compn of gas (vol) | Concn of V compd-contg soln (oxalic acid soln of $NH_4VO_3$) (mol/l) | Amount of active layer (g/$m^2$) | Content of V compd (g/$m^2$) | Denitration efficiency (%) at reaction temp of: | | | |
|---|---|---|---|---|---|---|---|---|
| | | | | | 250° C. | 300° C. | 350° C. | 400° C. |
| 10 | Room temperature 2 hours $N_2$ gas contg 250 ppm $SO_2$ | 1 | 137 | 2.9 | 45.0 | 83.1 | 96.2 | 99.0 |
| 11 | 300° C. 2 hours $N_2$ gas contg 250 ppm $SO_2$ | 1 | 135 | 3.1 | 43.8 | 81.5 | 95.8 | 98.0 |
| | 300° C. | | | | | | | |

Table 3-continued

| Ex. No. | SO₂ treatment conditions Temperature Time Compn of gas (vol) | Concn of V compd-contg soln (oxalic acid soln of NH₄VO₃) (mol/l) | Amount of active layer (g/m²) | Content of V compd (g/m²) | Denitration efficiency (%) at reaction temp of: | | | |
|---|---|---|---|---|---|---|---|---|
| | | | | | 250° C. | 300° C. | 350° C. | 400° C. |
| 12 | 2 hours SO₂(250 ppm) + H₂O(10%) O₂(3.6%) + N₂(86.4%) | 0.5 | 135 | 2.7 | 39.2 | 78.5 | 95.0 | 97.8 |
| 13 | " | 1 | 137 | 3.3 | 45.5 | 82.1 | 96.1 | 98.8 |
| 14 | " | 1.5 | 137 | 3.6 | 50.3 | 80.6 | 93.8 | 96.5 |
| 15 | " | 2 | 140 | 4.2 | 46.0 | 77.2 | 87.1 | 88.8 |

(The amount of active layer and the content of V compound in Table 3 have the same meanings as in Table 2.)

As apparent from Table 3, the catalysts obtained in Examples 10 to 15 have high activity not only at high temperatures of around 400° C. as well as at low temperatures of around 250° C.

EXAMPLE 16

First and second steps:

The same procedures as in the first and second steps of Example 1 were repeated to form a porous surface layer on a steel panel.

Third step:

The steel panel having the porous surface layer was immersed in 200 ml of oxalic acid solution containing 1 mole of ammonium metavanadate per liter of the solution at room temperature for 0.1 hour. The steel panel was then withdrawn from the solution and dried at about 100° C., whereby a catalyst containing the vanadium compound was prepared.

After the third step, the catalyst was heattreated in the atmosphere at 680° C. for 1 hour.

EXAMPLES 17 TO 34

First and second steps:

The same procedures as in the first and second steps of Example 1 were repeated to form a porous surface layer on each steel panel.

The porous surface layer of the steel panel resulting from the second step was subjected to oxidizing treatment and/or sulfating treatment under the conditions listed in Table 4.

Third step:

The treated steel panel was immersed in the solution containing a vanadium compound listed in Table 4 under the conditions given in the same table, then withdrawn from the solution and dried, whereby a catalyst was produced with the vanadium compound supported thereon.

Subsequent to the third step, the catalyst was heat-treated under the conditions indicated in Table 4.

COMPARISON EXAMPLE 4

In the same manner as in the first and second steps of Example 1, a catalyst in the form of a steel panel having a porous surface layer was obtained. The catalyst was oxidized and sulfated under the conditions shown in Table 4.

Table 4 also shows the amount of active layer and the content of V compound of each of the catalysts prepared in Examples 16 to 34 and Comparison Example 4.

Activity test

The catalysts obtained in Examples 16 to 34 and in Comparison Example 4 were also tested for denitration efficiency in the following manner.

Panels of the catalyst were charged into the catalyst accommodating portion, in the form of a rectangular parallelepiped, of a reactor tube. With use of a usual flow system, air containing 2500 ppm by volume of SO₃ and 3% by volume of water vapor was passed through the reactor tube at a flow rate of 1 liter per minute for 1 hour to treat the catalyst with SO₃ while controlling the reaction temperature. Subsequently a simulated exhaust gas having the composition shown in Table 1 was passed through the reactor tube at a flow rate of 1 liter per minute for denitration reaction while controlling the temperature. During the reaction, the concentration of NO$_x$ was measured at the inlet and outlet of the reactor tube. The same procedure as above was repeated for each catalyst to determine the denitration efficiency. Table 4 shows the results.

Table 4

| Ex No. | Treating conditions | | | | | Amount of active layer (g/m²) Content of V compd (g/m²) | Denitration efficiency (%) at reaction temp of: | | |
|---|---|---|---|---|---|---|---|---|---|
| | Oxidizing treatment Temp Time Compn of atm (vol) | Sulfating treatment Temp Time Compn of atm (vol) | Immersion treatment V compd solution Concn of solution Temp Time | | Heat treatment Temp Time Compn of atm (vol) | | 275° C. | 325° C. | 375° C. |
| 16 | — | — | Oxalic acid soln of NH₄VO₃ 1.0 mole/l Room temp 0.1 hr | | 680° C. 1 hr Air | 147 6.6 | 23.4 | 66.0 | 83.6 |
| 17 | 300° C. 3 hr O₂(3%) + H₂O(3%) + N₂(balance) | — | " | | " | 142 6.2 | 28.0 | 67.0 | 85.8 |
| | | 300° C. 3 hr | | | | 140 | | | |

Table 4-continued

| Ex No. | Treating conditions | | | | Amount of active layer (g/m²) Content of V compd (g/m²) | Denitration efficiency (%) at reaction temp of: | | |
|---|---|---|---|---|---|---|---|---|
| | Oxidizing treatment Temp Time Compn of atm (vol) | Sulfating treatment Temp Time Compn of atm (vol) | Immersion treatment V compd solution Concn of solution Temp Time | Heat treatment Temp Time Compn of atm (vol) | | 275° C. | 325° C. | 375° C. |
| 18 | | N₂ gas contg SO₂(5000 ppm) | " | " | 8.3 | 16.5 | 64.7 | 81.0 |
| 19 | Room temp 20 hr Air | " | " | " | 146 8.5 | 21.4 | 66.5 | 83.2 |
| 20 | 300° C. 3 hr O₂(3%) + H₂O(3%) + N₂ (balance) | 300° C. 3 hr SO₂(250 ppm) + H₂O(5%) + O₂(4%) + N₂ (balance) | " | " | 143 8.4 | 24.2 | 69.6 | 82.3 |
| 21 | " | Room temp 10 hr N₂ gas contg SO₂ (5000 ppm) | " | " | 145 8.0 | 26.4 | 64.2 | 82.7 |
| 22 | " | 300° C. 3 hr N₂ gas contg SO₂ (5000 ppm) | Oxalic acid soln of NH₄VO₃ 1.0 mole/l 60° C. 1 hr | " | 152 10.6 | 19.6 | 66.3 | 81.9 |
| 23 | " | 300° C. 3 hr O₂(4%) + SO₂(250 ppm) + N₂(balance) 300° C. | Oxalic acid soln of NH₄VO₃ 1.0 mole/l Room temp 0.1 hr | " | 151 8.7 | 23.7 | 65.2 | 82.3 |
| 24 | 300° C. 3 hr O₂(3%) + H₂O(3%) + N₂(balance) | 3 hr N₂ gas contg SO₂(5000 ppm) | Aq soln of NH₄VO₃ 0.1 mole/l Room temp 0.1 hr | " | 140 2.5 | 19.5 | 68.5 | 88.3 |
| 25 | " | " | Oxalic acid soln of vanadium pentoxide 1.0 mole/l Room temp 0.1 hr | " | 145 8.4 | 23.8 | 65.2 | 81.6 |
| 26 | " | " | Aq soln of vanadyl sulfate 1.0 mole/l Room temp 0.1 hr | 680° C. 1 hr Air | 147 6.5 | 25.0 | 68.3 | 84.5 |
| 27 | " | " | Oxalic acid soln of NH₄VO₃ 0.5 mole/l Room temp 0.1 hr | " | 142 6.4 | 18.5 | 57.5 | 77.4 |
| 28 | " | " | Oxalic acid soln of NH₄VO₃ 0.1 mole/l Room temp 0.1 hr | " | 148 1.2 | 24.8 | 57.0 | 81.3 |
| 29 | " | " | Oxalic acid soln of NH₄VO₃ 1.0 mole/l Room temp 0.1 hr | 400° C. 1 hr Air | 143 8.4 | 9.2 | 45.3 | 64.2 |
| 30 | " | " | " | 500° C. 1 hr Air | 150 8.7 | 28.1 | 62.9 | 78.0 |
| 31 | " | " | " | 600° C. 1 hr Air | 145 8.6 | 30.0 | 69.0 | 81.8 |
| 32 | " | " | " | 700° C. 1 hr Air | 141 8.3 | 17.5 | 51.3 | 73.3 |
| 33 | " | " | " | 800° C. 1 hr Air | 143 8.5 | 4.8 | 20.0 | 41.3 |
| 34 | " | " | " | 680° C. 1 hr O₂(5%) + H₂O(5%) + N₂(balance) | 147 8.5 | 23.4 | 70.2 | 82.6 |
| Comp Ex | " | " | — | — | 150 | 2.5 | 13.7 | 37.5 |

Table 4-continued

| | Treating conditions | | | | Amount of active layer (g/m²) | | |
|---|---|---|---|---|---|---|---|
| | Oxidizing treatment | Sulfating treatment | | | Heat treatment | | |
| | Temp Time | Temp Time | Immersion treatment | | Temp Time | Content of V compd | Denitration efficiency (%) at reaction temp of: |
| Ex No. | Compn of atm (vol) | Compn of atm (vol) | V compd solution Concn of solution Temp Time | | Compn of atm (vol) | (g/m²) | 275° C.  325° C.  375° C. |
| 4 | | | | | | — | |

(The amount of active layer and the content of V compound in Table 4 have the same meanings as above.)

As will be apparent from Table 4, the catalysts obtained in Examples 16 to 34 have high activity at high temperatures and also at temperatures slightly lower than 300° C. and possess outstanding resistance to $SO_3$. The graph of the drawing shows the relationship between the heat treating temperature and the denitration efficiency determined in respect of the catalysts prepared in Examples 18 and 29 to 33. The graph reveals that the catalysts heat-treated at a temperature of 450° to 700° C., especially at about 640° C. have high activity even after the forced treatment with $SO_3$.

What is claimed is:

1. A process for producing a highly active denitrating catalyst consisting essentially of the steps of converting the surface layer of steel material to an aluminum alloy, treating the resulting steel material with an aluminum dissolving solution to dissolve out the aluminum and to render the surface layer porous, subjecting the resulting porous surface layer to oxidizing treatment with an oxygen-containing gas, immersing the steel material having the thus oxidized porous surface layer in a solution containing a vanadium compound to impregnate the porous surface layer with the vanadium compound, and drying the obtained steel material.

2. A process as defined in claim 1 wherein the surface layer of steel material is converted to an aluminum alloy by heat-treating an aluminum-coated steel material.

3. A process as defined in claim 1 wherein the aluminum is dissolved out by immersing the steel material having the alloy layer in the aluminum dissolving solution.

4. A process as defined in claim 1 wherein the aluminum dissolving solution is an aqueous solution of an alkali metal hydroxide.

5. A process as defined in claim 1 wherein the solution containing a vanadium compound is selected from the group consisting of an aqueous solution and an oxalic acid solution of ammonium metavanadate, an oxalic acid solution of vanadium pentoxide and an aqueous solution of vanadyl sulfate.

6. A process as defined in claim 1 wherein the oxidizing treatment is conducted under mild conditions.

7. A process as defined in claim 1 wherein the oxidizing gas contains 0.1 to 20.8% by volume of oxygen.

8. A process as defined in claim 1 wherein the steel material is heat-treated after the drying step at a temperature of 450° to 700° C.

9. A process as defined in claim 1 wherein after the resulting porous surface layer has been subjected to oxidizing treatment with an oxygen-containing gas, the thus oxidized porous surface layer is subjected to sulfating treatment with a gas containing sulfur dioxide gas.

10. A process as defined in claim 9 wherein the sulfating gas contains at least 100 ppm of sulfur dioxide gas.

* * * * *